(12) United States Patent
Sutton

(10) Patent No.: US 7,933,257 B2
(45) Date of Patent: Apr. 26, 2011

(54) USING QOS TUNNELS FOR TCP LATENCY OPTIMIZATION

(75) Inventor: Carl David Sutton, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 677 days.

(21) Appl. No.: 11/524,723

(22) Filed: Sep. 20, 2006

(65) Prior Publication Data

US 2008/0069111 A1 Mar. 20, 2008

(51) Int. Cl.
*H04L 12/28* (2006.01)

(52) U.S. Cl. ........................................ 370/351; 370/401

(58) Field of Classification Search ........................ None
See application file for complete search history.

(56) References Cited

U.S. PATENT DOCUMENTS

| | | | | |
|---|---|---|---|---|
| 6,038,233 A * | 3/2000 | Hamamoto et al. | .......... | 370/401 |
| 6,519,254 B1 * | 2/2003 | Chuah et al. | .................. | 370/389 |
| 6,538,416 B1 * | 3/2003 | Hahne et al. | .................. | 370/431 |
| 6,975,647 B2 * | 12/2005 | Neale et al. | .................. | 370/466 |
| 7,185,112 B1 * | 2/2007 | Kuranari et al. | ............. | 709/249 |
| 7,219,158 B2 * | 5/2007 | Border et al. | ................ | 709/240 |
| 7,266,081 B2 * | 9/2007 | Suum ki et al. | ............... | 370/235 |
| 7,283,517 B2 * | 10/2007 | Yan et al. | ...................... | 370/352 |
| 7,360,083 B1 * | 4/2008 | Ragireddy et al. | ............ | 713/160 |
| 7,398,552 B2 * | 7/2008 | Pardee et al. | ................... | 726/15 |
| 7,477,657 B1 * | 1/2009 | Murphy et al. | ............... | 370/468 |
| 7,542,471 B2 * | 6/2009 | Samuels et al. | ............... | 370/392 |
| 7,551,620 B1 * | 6/2009 | Samuels et al. | ............... | 370/394 |
| 7,596,802 B2 * | 9/2009 | Border et al. | ..................... | 726/1 |
| 7,643,416 B2 * | 1/2010 | Pardee et al. | ..................... | 370/231 |
| 7,656,799 B2 * | 2/2010 | Samuels et al. | ............... | 370/231 |
| 2003/0076794 A1 * | 4/2003 | Kawasaki et al. | ............ | 370/329 |
| 2003/0123481 A1 * | 7/2003 | Neale et al. | ................... | 370/466 |
| 2003/0210691 A1 * | 11/2003 | Chen et al. | .................... | 370/389 |
| 2003/0219022 A1 * | 11/2003 | Dillon et al. | ............. | 370/395.52 |
| 2004/0044789 A1 * | 3/2004 | Angel et al. | ................... | 709/238 |

OTHER PUBLICATIONS

Debojyoti Dutta and Yongguang Zhang, HRL Laboratories LLC., An Active Proxy Based Architecture for TCP in Heterogeneous Variable Bandwidth Networks, IEEE GLOBECOM 2001, Copyright 2001 IEEE. 5 pages.

* cited by examiner

*Primary Examiner* — Phirin Sam

(74) *Attorney, Agent, or Firm* — Stolowitz Ford Cowger LLP

(57) ABSTRACT

A method of transmitting data from a source to a destination is described. A quality of service (QoS) tunnel is established between the source and the destination. Traffic from the source, and intended for the destination, will be sent via this tunnel. The traffic is manipulated by passing it through a performance enhancement proxy (PEP), in order to eliminate the "slow start" mechanism inherent to TCP traffic.

19 Claims, 6 Drawing Sheets

Exemplary Network 200

Exemplary Network 200

Expanded Exemplary Network 300

Flowchart 400

Router 500

Flowchart 600

USING QOS TUNNELS FOR TCP LATENCY OPTIMIZATION

BACKGROUND

1. Field of the Invention

The present invention pertains to the field of computer network communications, and specifically to the use of performance enhancing proxies for TCP latency optimization.

2. Related Art

One of the underlying protocols used for computer network traffic, and in particular Internet traffic, is the Transmission Control Protocol (TCP). Integral to TCP is a certain amount of latency, while the connection between one endpoint and another is first negotiated, and then the transmission speed between those two points ramps up. In the earlier days of networking and the Internet, and even over many modern networks, the time lost during this "slow-start" TCP negotiation is relatively inconsequential.

The slow-start approach to flow control was adopted for TCP for a reason. Simply, the slow-start represents a sort of "gentleman's agreement," whereby no single connection seizes a disproportionate amount of available bandwidth. Essentially, when transmitting data, an endpoint transmits a small amount of data, e.g. one packet, and checks for conflicts. If no conflict exists, the endpoint can send out a slightly greater amount of data, e.g. two packets, and check for conflicts. This process can continue to increase, or "ramp up," until it starts interfering with other transmissions. Once that occurs, the transmitting endpoint eases back on the transmission speed, so as to avoid interfering with other transmissions.

However, with modern high speed networks, particularly, for example, the dedicated connections that often exist between a corporate office and a branch office, much higher bandwidths tend to be available. As such, this inherent TCP latency results in proportionately more time lost than previously.

Several older approaches attempt to address this latency issue. Simply reducing the amount of data to be transmitted, e.g., by using very simple web pages, helps to alleviate this issue somewhat, as less total time is necessary to complete the transmission. This does not, however, actually solve the problem.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
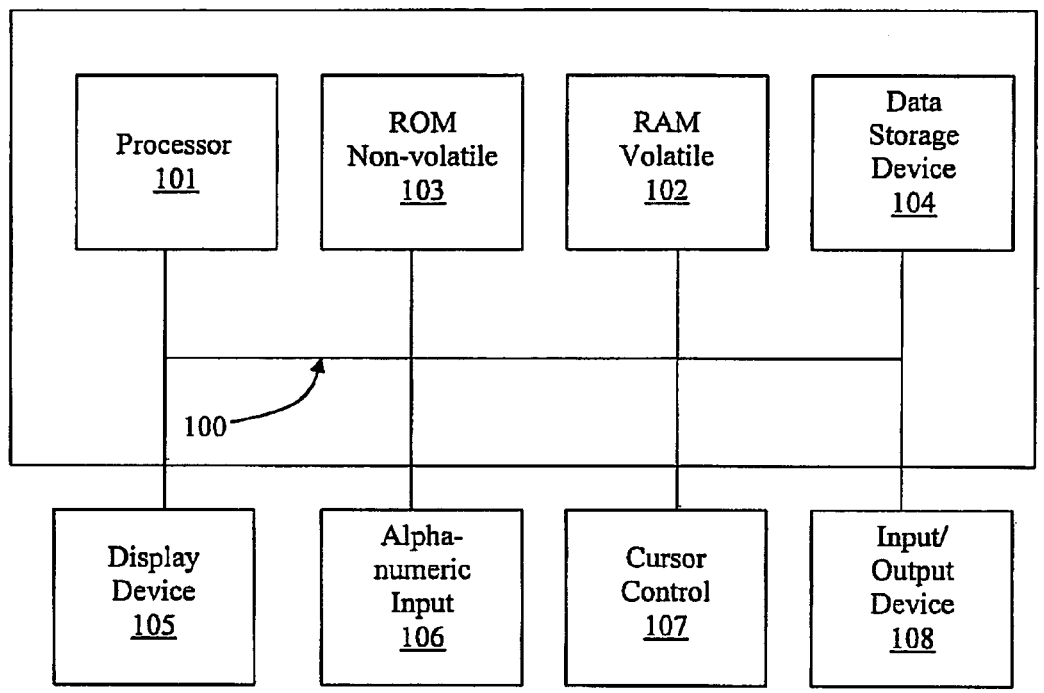
FIG. 1 is a block diagram of an exemplary computer system upon which embodiments of the present invention may be implemented.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Exemplary Computer System

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network. Input/Output device 108 may also include a Universal Serial Bus (USB) interface for connected peripherals including security peripherals, such as a token device. In one embodiment, a USB "flash memory" device may contain a secret or accept a secret from one device and act as a "courier" to transport that secret to another device. In such an embodiment, the two devices are said to be securely "introduced" for the purposes of establishing a secure association based on the secret from the USB memory.

Quality of Service Tunnels and Performance Enhancement Proxies

In order to reduce or remove the effect of TCP latency on network traffic, a combination of a TCP Performance Enhancement Proxy (PEP) and a quality of service (QoS) tunnel is presented, in accordance with one embodiment of the present invention. A QoS tunnel is used to define and reserve a bandwidth tunnel between two points. A PEP at each end of this virtual link can then be used to multiplex all TCP traffic between these two endpoints, and manage the available bandwidth and traffic flows. Because a QoS tunnel is used, which has known bandwidth and speed characteristics, the slow start mechanism used by TCP does not need to be used in this situation, as there is no concern about interfering with other transmissions.

A Performance Enhancement Proxy, or PEP, is a TCP proxy that terminates the TCP connection close to a client, by pretending to be other end of the connection. This allows the client to transmit the TCP data to the PEP had a much faster rate than it would be able to send it over a network connection to the intended destination. The PEP can then take all of the data from the client and transmit it to a second PEP at the receiving end of the connection using some protocol other than TCP.

A quality of service (QoS) tunnel, such as an RSVP tunnel, is normally used to establish a connection between two points on a network, with several properties. First, the QoS tunnel provides noninterference with other users of the network: traffic over the tunnel does not interfere with any other traffic outside of the tunnel, and traffic outside of the tunnel does not interfere with traffic within the tunnel. Second, the QoS tunnel provides bandwidth and latency guarantees across the network. QoS systems like RSVP were originally established to create a computer networking equivalent to circuit-switched telephony; rather than sending packets out across the network, each of which may take different routes before arriving at the intended destination, an RSVP tunnel, for example, defines a specific pathway across the network, such that all traffic follows the same route. Additionally, this tunnel uses a fixed, defined amount of bandwidth, with certain latency guarantees, across the entire network.

The combination of a QoS tunnel with a PEP allows for the combination of a PEP's improvements to data transfer, combined with defined bandwidth and known latency guarantees. The advantages offered by this combination will become apparent, through the following embodiments of the invention.

Exemplary Network

Figure 2:
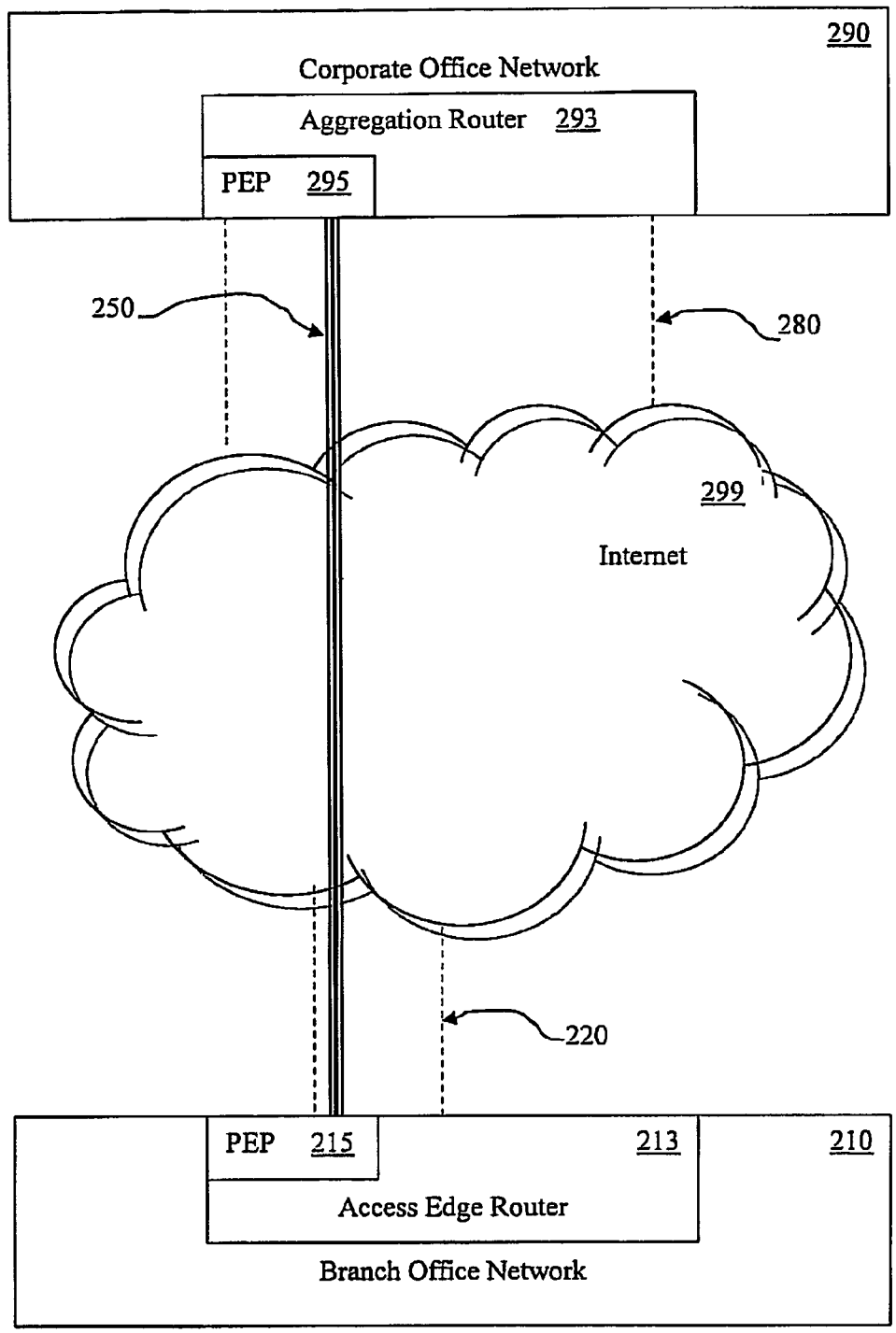
FIG. 2 is a depiction of an exemplary network, upon which embodiments of the present invention may be implemented.

With reference now to FIG. 2, an exemplary network 200 is depicted, upon which embodiments of the present invention may be implemented. While exemplary network 200 is shown as incorporating specific, enumerated components, it is understood that embodiments of the present invention are well suited for applications differing from that shown in exemplary network 200. For example, in some embodiments, additional, fewer, or different components are utilized.

Exemplary network 200 shows a branch office network 210 interacting with a corporate office network 290. While some embodiments of the present invention can be adapted to work with any interaction between one computer or network and another, the interaction between a branch office and corporate office is one that will derive significant advantage from application of an embodiment of the present invention. In particular, if a branch office needs to transmit a substantial quantity of network traffic in small amounts back to a corporate office, and receive a response for each such transmittal, e.g., numerous transactional processes, the reduced overhead for TCP latency would provide a substantial benefit.

Branch office network 210, in some embodiments, varies in size from a single computer, such as system 112, to many dozens or hundreds of such machines. Branch office network 210 is shown as incorporating a router, such as access edge router 213. In the depicted embodiment, access edge router 213 includes performance enhancement proxy (PEP) 215. Branch office network 210 is connected to the Internet 299. This connection is depicted as pipe 220. In some embodiments, pipe 220 has a fixed bandwidth associated with it, which limits the amount of data that branch office 210 can receive and/or transmit at once.

Corporate office network 290 is shown as incorporating a router, such as aggregation router 293. In the depicted embodiment, aggregation router 293 includes performance enhancement proxy (PEP) 295.

Corporate office network 290 is connected to the Internet 299. This connection is depicted as pipe 280. In many real-world applications, pipe 280 is likely to have much greater bandwidth available then pipe 220, as a single corporate office network site only to support multiple branch office locations simultaneously, which necessitates larger data transferal and receipt capability. However, it is not a requirement of the present invention that this be so.

A QoS tunnel 250 is shown as running between branch office network 210 and corporate office network 290. More specifically, QoS tunnel 250 allows data to be transferred from PEP 215 to PEP 295.

Figure 3:
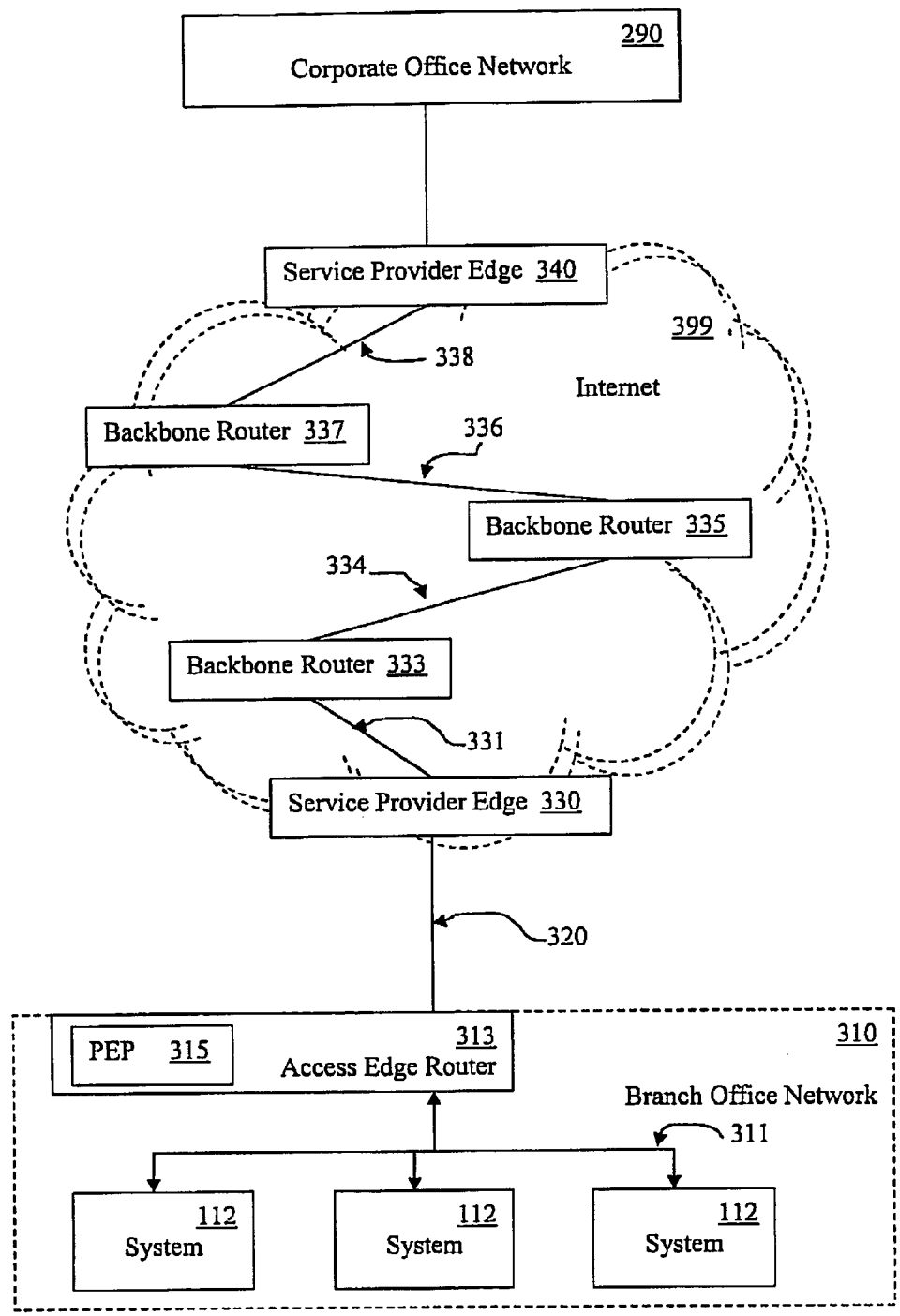
FIG. 3 is a depiction of an expanded exemplary network, upon which embodiments of the present invention may be implemented.

With reference now to FIG. 3, a depiction of an expanded exemplary network 300 is shown, upon which embodiments of the present invention may be practiced. While expanded exemplary network 300 is shown as incorporating specific, enumerated components, it is understood that embodiments of the present invention are well suited for applications differing from that shown in expanded exemplary network 300. For example, in some embodiments, additional, fewer, or different components are utilized.

In FIG. 3, a branch office network 310 is shown as incorporating multiple computer systems 112. These computer systems 112 are connected to an access edge router 313. Access edge router 313 has a connection 320 to a service provider edge router 330. Through service provider edge router 330, branch office network 310 is connected to the Internet 399.

When data is transferred between two points over the Internet, such as between branch office network 310 and corporate office network 390, it is passed along a series of connections. It is unlikely that data will be able to flow directly from the originating point to its destination. In the majority of cases, network traffic will make several "hops" as it is routed to its destination.

Internet 399 is depicted as incorporating several routers along the path between branch network 310 and corporate office network 390. It is understood that the routers depicted as part of Internet 399 are intended as illustrative only. The number of hops between the branch office network and corporate office network will vary.

Service provider edge 330 is connected to backbone router 333 via connection 331. Backbone router 333 is connected to backbone router 335 via connection 334. Backbone router 335 is connected to backbone router 337 via connection 336. Backbone router 337 is connected to service provider edge 340 via connection 338. Corporate office network 390 connect to Internet 399 via service provider edge 340.

Using QoS Tunnels with a PEP

Figure 4:
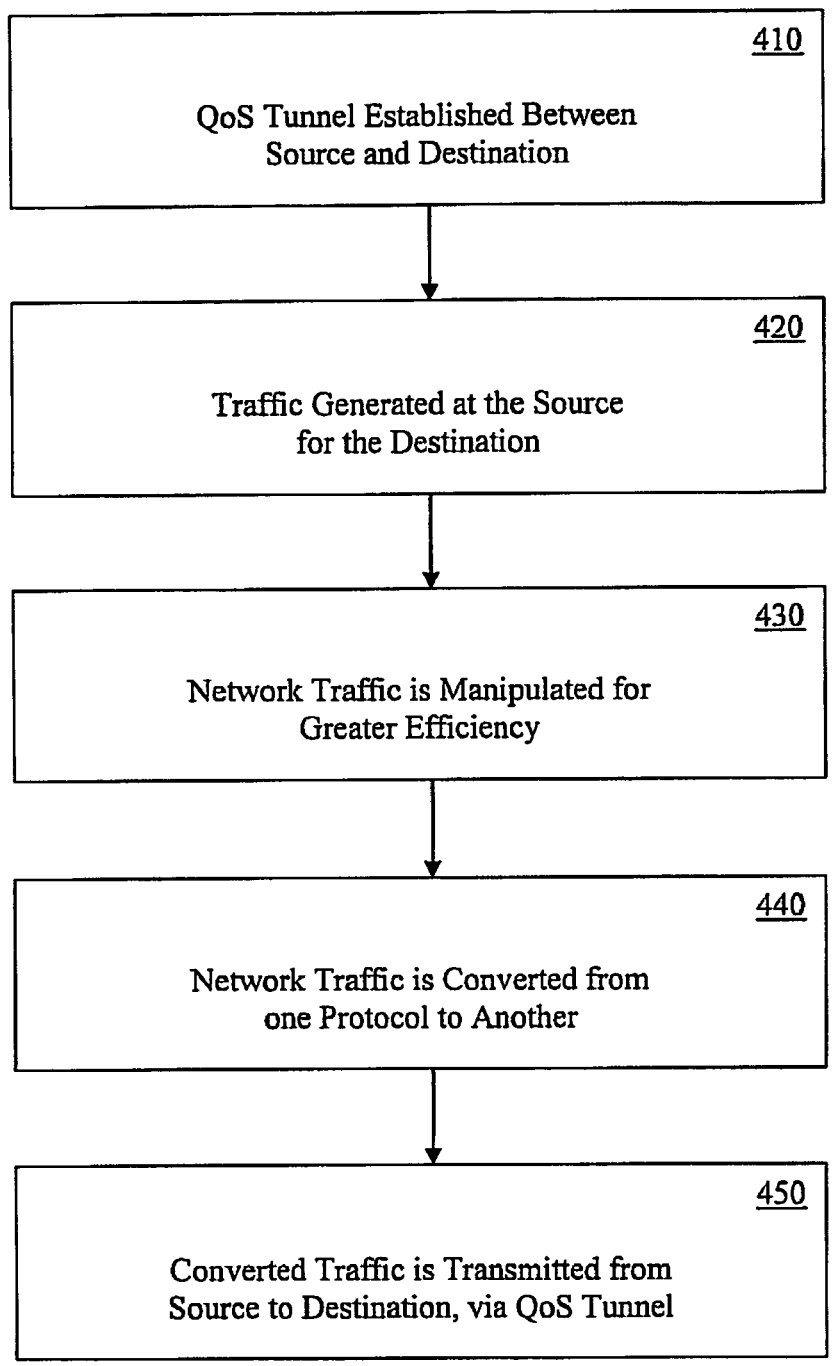
FIG. 4 is a flowchart of a method of using a quality of service (QoS) tunnel in conjunction with a performance enhancement proxy (PEP) to accelerate TCP traffic, in accordance with one embodiment of the present invention.

With reference now FIG. 4, a flowchart 400 of a method of using a QoS tunnel in conjunction with a PEP to accelerate TCP traffic is depicted, in accordance with one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410 and FIGS. 2 and 3, in some embodiments a QoS tunnel is established between two locations, e.g., a source and a destination, across a network. For example, an RSVP tunnel 250 is created between branch office network 210 and corporate office network 290. More specifically, this tunnel is created between an access edge router, such as access edge router 213 and an aggregation router, such as aggregation router 293.

The type and attributes of the QoS tunnel that is used will vary across different embodiments. In some embodiments, the type of the QoS tunnel utilized is such that the QoS tunnel provides noninterference from other traffic being sent across the network, and avoids interfering with other network traffic. Additionally, in some such embodiments, the QoS tunnel utilized provides bandwidth and latency guarantees.

In one embodiment, an RSVP tunnel is utilized. The amount of bandwidth available to the RSVP tunnel is, in part, configurable. For example, the proportion of pipe 220 that RSVP tunnel 250 is allowed to utilize can be configured, e.g., by a user or administrator. In some embodiments, the amount of bandwidth available to the RSVP tunnel is also limited by the available bandwidth along the route between the source and the destination. For example, with reference to FIG. 3, the bandwidth available to an RSVP tunnel running between branch office network 310 and corporate office network 390 is limited by the available bandwidth for connections 331, 334, 336, and 338; in such a case, the tunnel could not guarantee bandwidth greater than the smallest available bandwidth for any of these connections. In some cases, these connections may be owned, operated, or administered by various entities, who may limit or otherwise restrict the bandwidth or latency requirements of such an RSVP tunnel.

With reference now to step 420 and FIGS. 2 and 3, in some embodiments traffic is generated within the source, for delivery to the destination. For example, one or more of the systems 112 within branch office network 310 may generate network traffic, e.g., TCP data, that is intended for corporate office network 390. In such a case, all such traffic is passed to access edge router 313.

With reference now to step 430 and FIGS. 2 and 3, in some embodiments this network traffic is compressed and/or multiplexed, for efficiency. In several such embodiments, this process is utilized to multiplex one or more transmissions or signals, in order to create a more efficient single transmission. For example, if several systems 112 within branch office network 310 are transmitting data for corporate office network 390 simultaneously, access edge router 313 can multiplex these signals together, in order to produce a more efficient transmission, which better utilizes the QoS tunnel between the two networks.

With reference now to step 440 and FIGS. 2 and 3, in some embodiments, network traffic intended for the destination is converted from one protocol into a second, more efficient, protocol. Some embodiments in which a PEP exists at both ends of the connection, e.g., at both the source and destination, utilize this step to transform data from a relatively inefficient protocol, such as TCP, into a different protocol, which does not suffer from the same limitations, e.g., one that does not include TCP's "slow start" mechanism. Other embodiments, including several in which there is not a PEP at both ends of the connection, omit this step.

With reference now to step 450 and FIGS. 2 and 3, in some embodiments, the network traffic is transmitted from the source to the destination through the QoS tunnel. This transmission is not limited by TCP's "slow start" mechanism. In some embodiments, this transmission is allowed to utilize all the available bandwidth of the QoS tunnel. In other embodiments, such as ones where several transmissions will be sent and received through the QoS tunnel simultaneously, this transmission may be more limited. In several such embodiments, transmission limitations are adjustable, e.g., higher priority traffic is allowed to utilize more of the available bandwidth than lower priority traffic, or transmission speeds can be scaled, in accordance with available bandwidth in the QoS tunnel.

Embodiments implementing the above-described method thus benefit from an improvement in latency between the source and destination, as the latency inherent to TCP may be avoided. Further, using a QoS mechanism, such as RSVP, allows for certainty in available bandwidth, transmission latency, and transmission route. Further, some embodiments can also realize an additional benefit, in that much of the redundancy and error checking mechanisms utilized by TCP, e.g., those used to recover from the loss of a packet, can be skipped. The mechanisms of the QoS tunnel are such that no data loss should occur, barring complete failure of some step along the path between source and destination.

Exemplary Router

Figure 5:
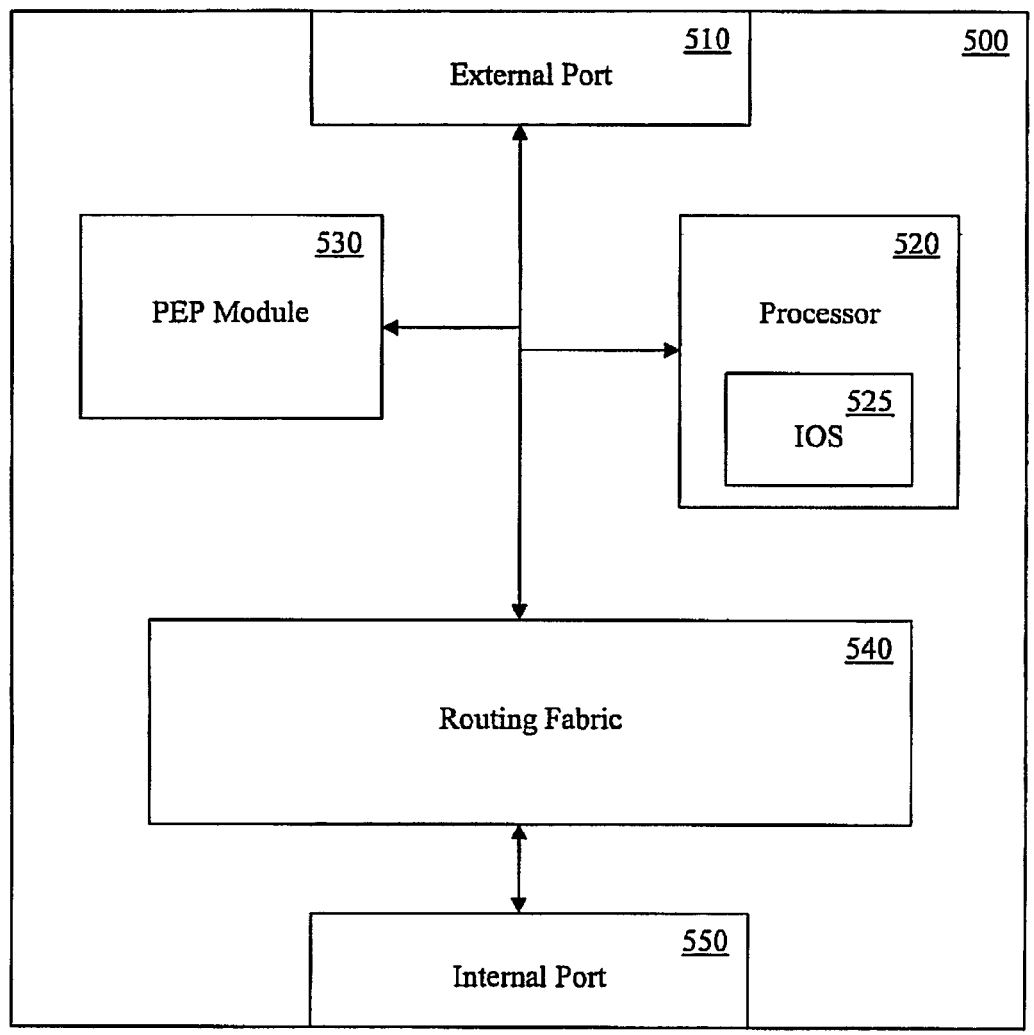
FIG. 5 is a block diagram of a router, upon which embodiments of the present invention may be implemented.

With reference now to FIG. 5, a block diagram of a router 500 is presented, in accordance with one embodiment of the present invention. While router 500 is depicted as incorporating certain, he enumerated features, is understood that embodiments of the invention are well suited for use on a alternative systems. For example, some embodiments of the present invention may be utilized on routers having additional, fewer, or different components that that depicted. In some embodiments, functionality ascribed to a particular component maybe combined with that of another component, or separate it out into several components. Further, in some embodiments, some of the functionality described as being part of router 500 may be performed by other, distinct systems, rather than by a router.

Router 500 is depicted as incorporating an external port 510. External port 510 is used by router 500 for sending and receiving network data outside of the local network. For example, router 500 may connect to a service provider, and hence to the Internet, through external port 510.

Router 500 is also depicted as incorporating a bus 501 interconnects varies components of router 500, and allows the transfer of information between connected components.

Router 500 incorporates a processor 520. In some embodiments, processor 520 controls the operation of router 500. In some such embodiments, processor 520 executes Internetwork Operating System (IOS) 525. IOS 525 is the operating environment for router 500.

Router 500 also includes a PEP module 530. PEP module 530, in some embodiments, implements a TCP performance enhancement proxy. In some embodiments, PEP module 530 is implemented in software, e.g., as part of IOS 525. In other embodiments, PEP module 530 is implemented at least partially in hardware, e.g., TCP acceleration hardware. Embodiments of present invention are well suited for use with any of these configurations.

Router 500 also incorporates routing fabric 540, and one or more internal ports 550. Systems connected to router 500 access router 500 through internal port 550.

Method of Operating a Router

Figure 6:
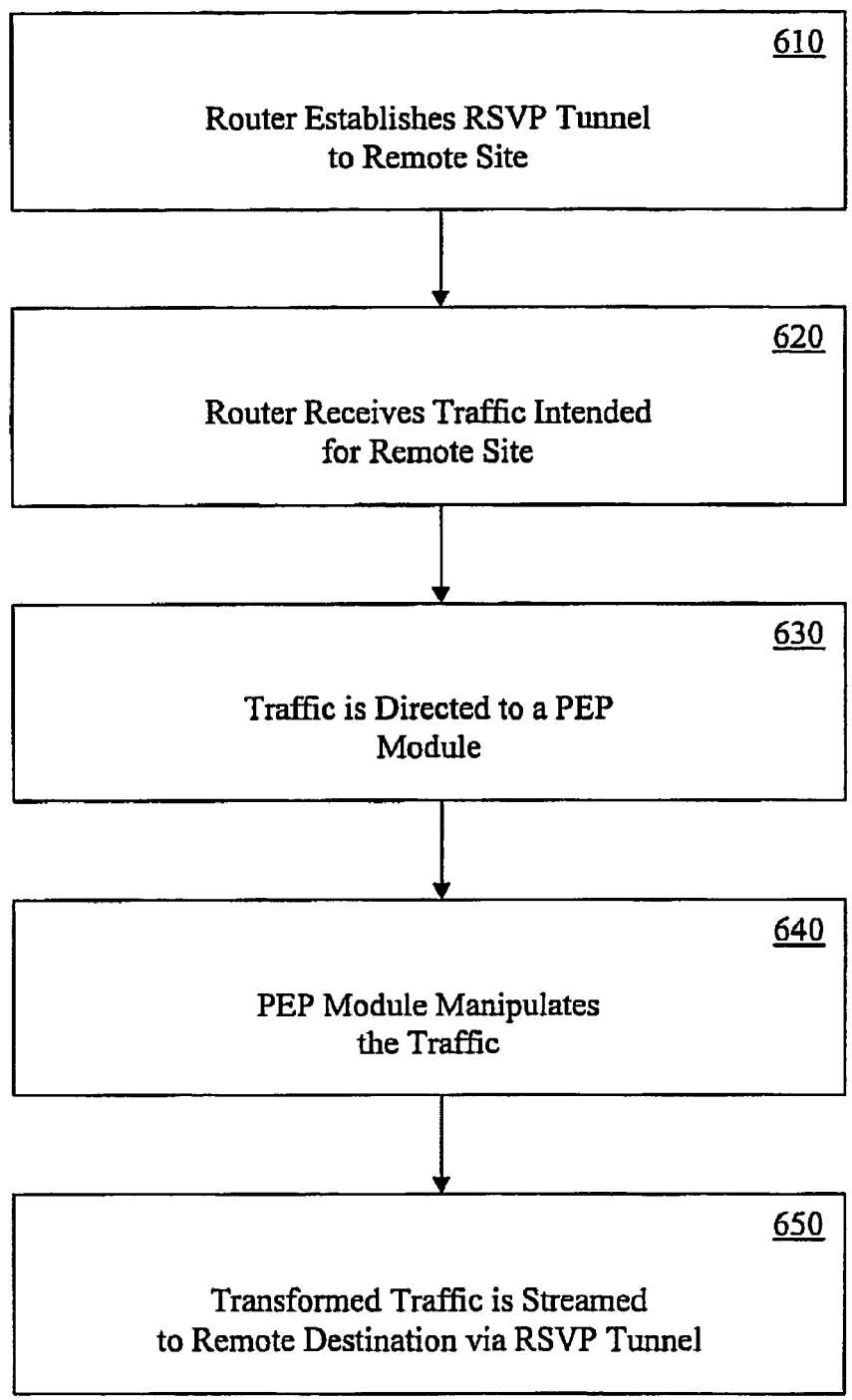
FIG. 6 is a flowchart of a method of using a router, in accordance with one embodiment of the present invention.

With reference now to FIG. 6, a flowchart of 600 of a method of operating a router is depicted, in accordance with one embodiment of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference to step 610 and FIG. 5, a router establishes an RSVP tunnel to a remote site. In some embodiments, the mechanism for establishing this RSVP tunnel is implemented as part of the operating system for the router, e.g., part of IOS 525. In other embodiments, a separate module may be utilized to implement this tunnel.

As was noted above, with reference to FIG. 4, the attributes utilized in establishing a QoS tunnel, such as an RSVP tunnel, may very with available bandwidth, as well as a user's decisions. Embodiments of present invention are well suited for use with all manner of QoS tunnels and configurations.

With reference to step 620 and FIG. 5, the router receives traffic intended for the remote site. For example, router 500 receives traffic via internal port 550, intended for the remote destination. In some embodiments, this traffic begins with a syn packet.

With reference to step 630 and FIG. 5, this traffic is directed to a PEP module. For example, upon receiving the syn packet, routing fabric 540 notes that the traffic is intended for the remote destination. A rule is invoked, which instructs the routing fabric to direct traffic intended for the remote destination to PEP module 530.

With reference to step 640 and FIG. 5, the PEP module manipulates the traffic. In some embodiments, the PEP module response to the syn packet by simulating the intended destination, allowing the original sender to transmit all the intended data at a much faster rate. The PEP module can take this data, and manipulate it in any of several different ways, in order to make the transmission to the destination more efficient. For example, the traffic may be multiplexed with other traffic intended for the destination, in order to more efficient use the bandwidth available. Alternatively, the traffic may be compressed, in order to reduce the necessary transmission length. Also, the traffic may be transformed from one protocol, e.g., TCP, to another, for more efficient transmission.

With reference now to step 650 and FIG. 5, the transformed traffic is streamed to the remote destination, over the RSVP tunnel. By transmitting the traffic using the RSVP tunnel, rather than as a normal TCP transmission, several advantages are realized. First, the use of a PEP reduces or eliminates the latency inherent to the TCP protocol, e.g., "slow start". Second, transmission via a QoS tunnel which provides latency and bandwidth guarantees, such as the RSVP tunnel, allows for more intelligent use of the available bandwidth. Third, by transmitting PEP data via a QoS tunnel, the need for an error correction mechanisms such as those present in TCP is greatly diminished, which further speeds the transmission process.

Embodiments of the present invention are thus described. While the present invention has been described in particular embodiments, it should be appreciated that the present invention should not be construed as limited by such embodiments, but rather construed according to the following claims.

What is claimed is:

1. A method of transmitting transmission control protocol (TCP) traffic from a source to a destination, comprising:
    establishing a quality of service (QoS) tunnel between said source and said destination, wherein said QoS tunnel has associated bandwidth or latency guarantees;
        wherein said bandwidth available in said QoS tunnel is configurable;
        wherein said source is an access edge router and said destination is an aggregation router;
    responsive to receiving a TCP SYN packet, directing said TCP traffic to a source performance enhancement proxy (PEP), wherein said TCP traffic is associated with said SYN packet;
    passing said TCP traffic through said source PEP configured for terminating a TCP connection proximate said source by spoofing a response of said destination, wherein said PEP removes a TCP slow-start flow control mechanism of a TCP protocol corresponding to said TCP traffic responsive to said spoofing;
    modifying said TCP traffic;
    transmitting said modified traffic from said source to said destination through said QoS tunnel;
    passing said modified traffic through a destination PEP to convert said modified TCP traffic back to an unmodified form; and
    receiving at said source PEP different TCP traffic from a destination PEP responsive to said spoofing.

2. The method of claim 1, wherein said modifying comprises:
    receiving said TCP traffic at said performance enhancement proxy (PEP); and
    converting said TCP traffic into said to a different protocol.

3. The method of claim 1, wherein said transmitting further comprises multiplexing said TCP traffic with other traffic intended for said destination.

4. The method of claim 3, wherein said transmitting further comprises:
    compressing said converted TCP traffic.

5. A router for use in transmitting TCP traffic from a first site to a second site, said router comprising:
    a first port, for receiving said TCP traffic from said first site;
    a routing fabric, coupled to said first port, for identifying a destination of said TCP traffic;
    a second port, coupled to said routing fabric, for transmitting said TCP traffic; and
    a performance enhancement proxy (PEP) module configured to transform said TCP traffic from a first networking protocol to a second networking protocol and to terminate a connection from said first site by mimicking a response to receipt of said TCP traffic expected by said first site, wherein said response prevents execution of a slow-start TCP operation for controlling TCP traffic flow;
    said PEP module coupled to said routing fabric, wherein said second port is configured to establish a quality of service (QoS) tunnel between said second port and said second site;
        wherein said QoS tunnel has latency and bandwidth guarantees and is configured for TCP data exchange between said first site and said second site responsive to prevention of the slow-start TCP operation;
        wherein said bandwidth available in said QoS tunnel is configurable; and
    said routing fabric is configured, upon determining said TCP traffic is intended for said second site, to direct said TCP traffic to said PEP module, wherein said second port is configured to transmit said transformed TCP traffic through said QoS tunnel.

6. The router of claim 5, further comprising:
    an operating system, executing upon a processor, for configuring said performance of said router, wherein said operating system is configured to cause said processor to establish said QoS tunnel.

7. The router of claim 6, wherein said QoS tunnel comprises an RSVP tunnel.

8. The router of claim 5, wherein said PEP module is configured to transform said TCP traffic from transmission control protocol (TCP) traffic into said second networking protocol, wherein said second networking protocol is more efficient for transmitting said transformed TCP traffic through said QoS tunnel.

9. The router of claim 5, wherein said PEP module is further configured to multiplex said transformed TCP traffic with other TCP traffic for transmission through said QoS tunnel.

10. The router of claim 5, wherein said second port is further configured to receive additional transformed TCP traffic, and said PEP module is further configured to convert said additional transformed TCP traffic into additional TCP traffic.

11. A computer-usable memory having computer-readable program code embodied therein for causing a processor to execute said program code, comprising:
    establishing a quality of service (QoS) tunnel between a router and a destination location;
        wherein a bandwidth available in said QoS tunnel is configurable;
    receiving TCP data for transmission to said destination location;
    responsive to receiving a TCP SYN packet, directing said TCP data to a PEP residing in said router configured for spoofing a response of said destination, wherein said PEP eliminates execution of a TCP slow-start flow control mechanism and receiving TCP data from a destination PEP residing on the destination location, responsive to said spoofing;
    manipulating said TCP data to improve transmission efficiency; and
    transmitting said manipulated TCP data through said QoS tunnel to said destination location.

12. The computer-usable memory of claim 11, wherein said manipulating comprises compressing said TCP data.

13. The computer-usable memory of claim 11, wherein said manipulating comprises encrypting said TCP data.

14. The computer-usable memory of claim 11, wherein said manipulating comprises multiplexing said TCP data with other TCP data intended for said destination location.

15. The computer-usable memory of claim 11, wherein said manipulating comprises transforming said TCP data from a first networking protocol into a second networking protocol.

16. A system, comprising:
means for establishing a quality of service (QoS) tunnel between a router and a destination location wherein a bandwidth available in said QoS tunnel is configurable;
means for receiving TCP data from a source for transmission to said destination location;
responsive to receiving a TCP SYN packet, means for directing said TCP data to a means for spoofing a response of said destination and means for sending said response to said source, said response configured to make said destination appear to said source, to be close to said source, wherein said means for spoofing removes execution of a TCP slow-start flow control mechanism, responsive to said spoofing;
means for permitting receiving TCP data from a destination PEP residing on the destination location responsive to said spoofing;
means for manipulating said data to improve transmission efficiency; and
means for transmitting said manipulated data through said QoS tunnel to said destination location.

17. The system of claim 16, wherein said means for manipulating said TCP data comprises:
means for transforming said TCP data from a first networking protocol into a second networking protocol; and
means for multiplexing said TCP data with other TCP data intended for said destination location.

18. A system, comprising:
means for receiving TCP traffic;
means for transmitting said TCP traffic;
means for directing said TCP traffic to a means for spoofing a response of a destination associated with said TCP traffic, wherein responsive to said response, TCP traffic is transmitted without execution of a TCP slow-start flow control mechanism; and
means for transforming said TCP traffic from a first networking protocol to a second networking protocol, wherein said means for transmitting is configured to establish a quality of service (QoS) tunnel between said means for transmitting and said destination, said means for transmitting is further configured to transmit said transformed TCP traffic through said QoS tunnel;
wherein said means for receiving TCP traffic is further configured to receive different transformed TCP traffic, and said means for transforming is further configured to convert said different transformed TCP traffic into an original form of said different transformed TCP traffic.

19. The system of claim 18, wherein said second networking protocol is more efficient for transmitting said transformed TCP traffic through said QoS tunnel.

* * * * *